United States Patent
Watson et al.

(10) Patent No.: US 6,400,557 B1
(45) Date of Patent: *Jun. 4, 2002

(54) CAPACITOR WITH FOLDED END PLATE TAB CONFIGURATION

(75) Inventors: Kirk S. Watson, Northbrook; John Nerz, Hawthorn Woods; Darioush Keyvani, Mt. Prospect, all of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/586,515

(22) Filed: Jun. 2, 2000

(51) Int. Cl.[7] .......................... H01G 4/228; H01G 9/00
(52) U.S. Cl. ......................................... 361/540; 361/525
(58) Field of Search ................................... 361/523–541

(56) References Cited

U.S. PATENT DOCUMENTS

| 3,632,498 A | | 1/1972 | Beer | |
|---|---|---|---|---|
| 4,899,259 A | * | 2/1990 | Voeten | 361/539 |
| 5,179,507 A | * | 1/1993 | Iijima | 361/534 |
| 5,198,967 A | * | 3/1993 | Kuranuki et al. | 361/523 |
| 5,638,253 A | * | 6/1997 | Hasegawa | 361/535 |
| 5,872,698 A | | 2/1999 | Bai et al. | |
| 5,982,609 A | * | 11/1999 | Evans | 361/516 |

* cited by examiner

Primary Examiner—Dean A. Reichard
Assistant Examiner—Eric W. Thomas
(74) Attorney, Agent, or Firm—Philip H. Burrus, IV; Bockhop & Reich, LLP

(57) ABSTRACT

A capacitor has a first side and an opposite second side. The capacitor also includes a first conductive member having a first planar surface and a first side edge, a first electrical connection extending from the first conductive member adjacent the first side. A second conductive member has a second planar surface. The second planar surface is spaced apart from and parallel to the first planar surface of the first conductive member. The second planar surface and the first planar surface define a space therebetween. The second conductive member also includes a third planar surface that is spaced apart from and disposed parallel to the second planar surface opposite from the first planar surface. A second electrical connection extends from the second planar surface adjacent the first side. The second conductive member also includes an electrically conductive portion, disposed adjacent the second side, electrically connecting the second planar surface and the third planar surface. A polymer electrolyte is disposed in the space defined by the first planar surface and the second planar surface. The polymer electrolyte is in contact with at least a portion of the first planar surface and at least a portion of the second planar surface.

6 Claims, 1 Drawing Sheet

CAPACITOR WITH FOLDED END PLATE TAB CONFIGURATION

BACKGROUND OF THE INVENTION

1. Field of the Invention

The present invention relates to electrolytic capacitors and, more specifically, to a capacitor with a relatively low effective surface resistance.

2. Description of the Prior Art

Recent developments in electrochemical cells have led to new types of cell-related electrochemical capacitors (ECC). As shown in FIG. 1, this type of device 100 usually includes two end plates 102, each coated whin an electro-active material 106, that sandwich a polymer electrolyte 114. An electrical connection tab 110 usually extends from each of the end plates 102.

Due to the design of the tab placements, the entire electro-active area is not completely used by the capacitor. This amount of non-use varies from one end plate material to the next. Thickness, form factor and chemistry all affect the effective surface resistance (ESR) of the endplate. Because the tabs are usually on the same end of the device, there is typically a non-uniform current flow through the device. For example, in a 4 cm by 4 cm square ECC that is 5 mil thick with 3 mil of electrolyte and two 1 mil titanium plates, at least 10% of the area of an ECC is not used to conduct charge. Furthermore, due to the highly corrosive nature of the electrolytic liquids used, many ECC's use end plates constructed from high resistance alloys to increase reliability (some common high resistance materials tend to be more resistant to the corrosive effects of electrolytic, liquids). Thus, typical ECC's tend to have a relatively high ESR.

Therefore, there is a reed for an electrochemical capacitor with a high capacitance and a low effective surface resistance.

DETAILED DESCRIPTION OF THE INVENTION

Figure 1:
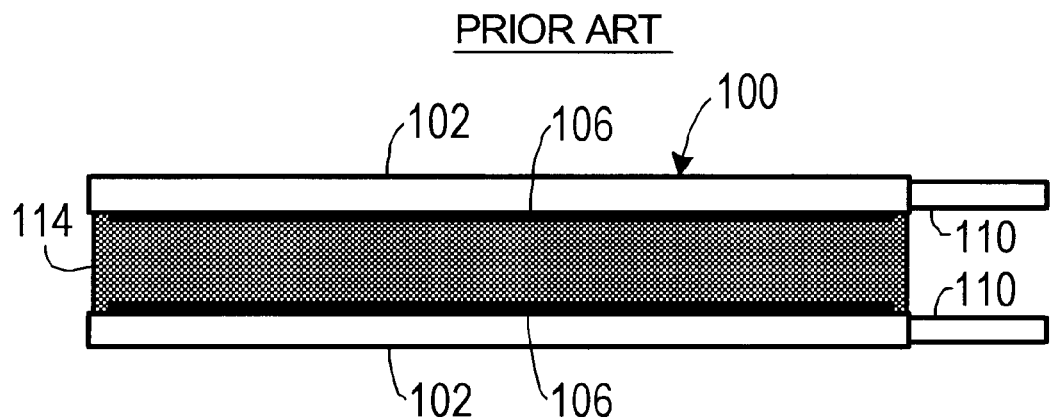
FIG. 1 is an elevational view of a prior art device.
Figure 2:
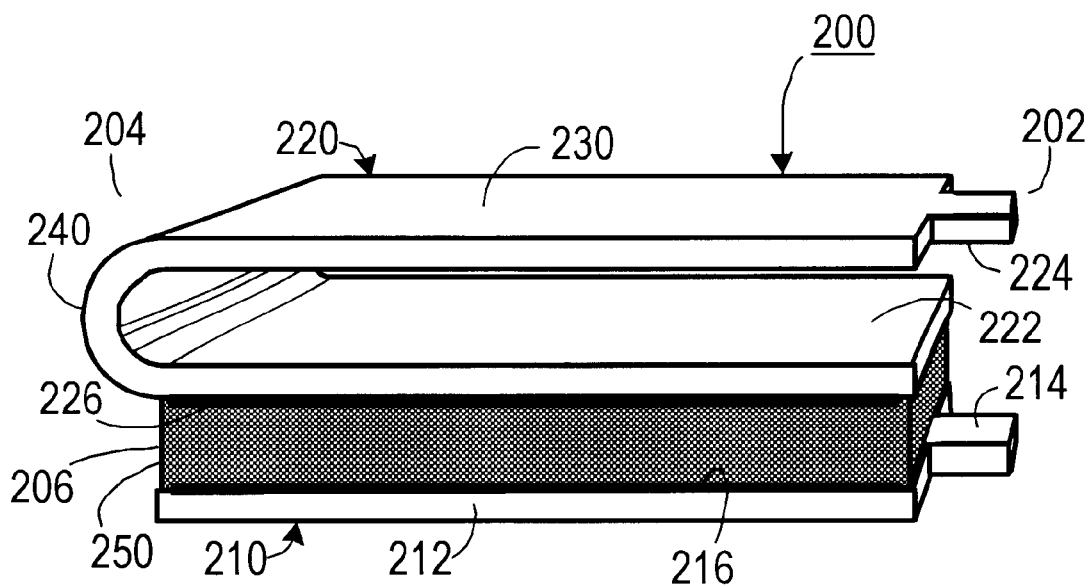
FIG. 2 is a perspective view of one illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context cleverly dictates otherwise: the meaning of "a," "an," and "the" includes plural reference, the meaning of "in" includes "in" and "on."

Electro-active materials are generally known to the art of capacitor design. Two illustrative examples of electro-active materials that may be employed with the present invention are disclosed in U.S. Pat. Nos. 3,632,498, issued to Beer, and 5,872,698, issued to Bai et al., the disclosures of both of these patents are incorporated herein by reference. The patent issued to Bai et al. discloses an electro-active electrode coating referred to herein as a "modified Beer coating." References in the patent issued to Bai et al. that refer to an "electrode active" layer correspond to the electro-active material as recited herein.

As shown in FIG. 1, one embodiment of the invention is an electrochemical capacitor (ECC) 200 having a first side 202 and an opposite second side 204. The ECC 200 includes a first conductive member 210 and an oppositely disposed second conductive member 220. The first conductive member 210 includes a first planar surface 212 and a first electrical connection 214 extending from the first conductive member 210 adjacent the first side 202.

The second conductive member 220 has a second planar surface 222 that is spaced apart from and parallel to the first planar surface 212 of the first conductive member 210. The second planar surface 222 and the first planar surface 212 define a space 206 between them.

The second conductive member 220 also includes a third planar surface 230 that is spaced apart from and disposed parallel to the second planar surface 222. A second electrical connection 224 extends from the second planar surface 230 adjacent the first side 202.

The second conductive member 230 also includes a U-shaped electrically conductive portion 240 disposed adjacent the second side 204. (However, it is understood that in other embodiments, the electrically conductive portion 240 could be one of many other shapes without departing from the scope of the invention.) The electrically conductive portion 240 electrically connects the second planar surface 222 and the third planar surface 230.

A polymer electrolyte 250, typically of the type disclosed in the patent issued to Bai et al., is disposed in a portion of the space 206 defined by the first planar surface 212 and the second planar surface 222. The polymer electrolyte 250 is in contact with at least a portion of the first planar surface 212 and at least a portion of the second planar surface 222. At least a portion of the first planar surface 212 is coated with a first electro-active material 216. The electro-active material could include a modified Beer coating, of the type disclosed in the patent issued to Bai et al. Similarly, at least a portion of the second planar surface 222 is coated with a second electro-active material 226, which could comprise the same material as the first electro-active material 216, or could be a different material, also of the modified Beer coating type.

In one specific embodiment, the first planar surface 212, the second planar surface 222 and the third planar surface 230 each have a surface area of approximately 4 cm by 4 cm and are constructed from 1 mil thick titanium. The space 206 defined by the first planar surface 212 and the second planar surface 222 is approximately 3 mil thick This device was tested for ESR across a range of frequencies from 1 Hz to 10 KHz and it was found that the ESR for the tested ECC was roughly 0.05 Ohms less than the ESR expected for a correspondingly-sized prior art ECC across the entire tested frequency range.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A capacitor having a first side and an opposite second side, comprising:

a. a first conductive member having a first planar surface, a first electrical connection extending from the first conductive member adjacent the first side;

b. a second conductive member having an electrically conductive portion, the second conductive member having a second planar surface, the second planar surface being spaced apart from and parallel to the first planar surface of the first conductive member, the second planar surface and the first planar surface defining a space therebetween, and a third planar surface, the third planar surface being spaced apart from and disposed parallel to the second planar surface opposite from the first planar surface with no solid material disposed in the space between the third planar surface and the second planar surface, a second electrical connection extending from the second planar surface adjacent the first side, the second conductive member also including an electrically conductive portion, disposed adjacent the second side, electrically connecting the second planar surface and the third planar surface; and c. a polymer electrolyte disposed in a portion of the space defined by the first planar surface and the second planar surface, the polymer electrolyte being in contact with at least a portion of the first planar surface and at least a portion of the second planar surface.

2. The apparatus of claim 1, wherein at least a portion of the first planar surface is coated with a first electro-active material.

3. The apparatus of claim 2, wherein the electro-active material comprises materials being fabricated of two materials selected from the group consisting of Ru oxide, Ti oxide, Ir oxide, Nb oxide, Zr oxide, Pd oxide, Pt oxide, tin oxide, tantalum oxide, vanadium oxide, molybdenum oxide, iron oxide, copper oxide, lead oxide, and combinations thereof.

4. The apparatus of claim 1, wherein at least a portion of the second planar surface is coated with a second electro-active material.

5. The apparatus of claim 4, wherein the electro-active material comprises materials being fabricated of two materials selected from the group consisting of Ru oxide, Ti oxide, Ir oxide, Nb oxide, Zr oxide, Pd oxide, Pt oxide, tin oxide, tantalum oxide, vanadium oxide, molybdenum oxide, iron oxide, copper oxide, lead oxide, and combinations thereof.

6. The apparatus of claim 1, wherein the electrically conductive portion of the second conductive member is U-shaped.

* * * * *